United States Patent
Clerckx et al.

(10) Patent No.: US 8,711,963 B2
(45) Date of Patent: Apr. 29, 2014

(54) UNIFIED FEEDBACK FRAME FOR SUPPORTING A PLURALITY OF FEEDBACK MODES AND A MULTIPLE-INPUT MULTIPLE-OUTPUT (MIMO) COMMUNICATION SYSTEM USING THE UNIFIED FEEDBACK FRAME

(75) Inventors: Bruno Clerckx, Seoul (KR); Ki Il Kim, Yongin-si (KR); Jun Il Choi, Seoul (KR); Jin Kyu Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 13/018,502

(22) Filed: Feb. 1, 2011

(65) Prior Publication Data

US 2011/0194631 A1  Aug. 11, 2011

Related U.S. Application Data

(60) Provisional application No. 61/303,341, filed on Feb. 11, 2010.

(51) Int. Cl.
*H04B 7/02* (2006.01)

(52) U.S. Cl.
USPC .......................................... 375/267

(58) Field of Classification Search
USPC ......... 375/260, 267, 295, 299, 316, 340, 346; 370/252, 328, 465
See application file for complete search history.

(56) References Cited

U.S. PATENT DOCUMENTS

| | | | | |
|---|---|---|---|---|
| 7,672,400 | B2 * | 3/2010 | Shapira et al. | 375/299 |
| 2008/0232501 | A1 | 9/2008 | Khojastepour et al. | |
| 2008/0232503 | A1 | 9/2008 | Kim | |
| 2008/0273624 | A1 | 11/2008 | Kent et al. | |
| 2009/0268840 | A1 | 10/2009 | Clerckx et al. | |
| 2009/0274230 | A1 * | 11/2009 | Heath et al. | 375/260 |
| 2009/0323841 | A1 | 12/2009 | Clerckx et al. | |
| 2010/0172256 | A1 * | 7/2010 | Mallik et al. | 370/252 |
| 2011/0002263 | A1 * | 1/2011 | Zhu et al. | 370/328 |
| 2011/0085618 | A1 * | 4/2011 | Zhuang et al. | 375/296 |
| 2013/0022139 | A1 * | 1/2013 | Chen et al. | 375/260 |

FOREIGN PATENT DOCUMENTS

| | | |
|---|---|---|
| KR | 10-2008-0114486 | 12/2008 |
| KR | 10-2009-0054357 | 5/2009 |
| WO | WO 2004/073169 A2 | 8/2004 |
| WO | WO 2007/050861 | 5/2007 |
| WO | WO 2009/064110 A2 | 5/2009 |

OTHER PUBLICATIONS

International Search Report issued Oct. 21, 2011, in counterpart International Application No. PCT/KR2011/000837 (3pp, in English).

* cited by examiner

*Primary Examiner* — Khanh C Tran
(74) *Attorney, Agent, or Firm* — NSIP Law

(57) ABSTRACT

Provided is a multiple-input multiple-output (MIMO) communication system that may provide a plurality of feedback modes. A receiver may feed back, to a transmitter, a base codeword indicator indicating one of base codewords included in the base codebook, a differential codeword indicator indicating one of differential codewords included in the differential codebook, and/or a correlation codeword indicator indicating one of correlation codewords included in the correlation codebook. The transmitter may generate a precoding matrix using at least one of the base codeword indicator, the differential codeword indicator, and the correlation codeword indicator.

26 Claims, 11 Drawing Sheets

DIFFERENTIAL MODE IN TIME DOMAIN

DIFFERENTIAL MODE IN FREQUENCY DOMAIN

US 8,711,963 B2

UNIFIED FEEDBACK FRAME FOR SUPPORTING A PLURALITY OF FEEDBACK MODES AND A MULTIPLE-INPUT MULTIPLE-OUTPUT (MIMO) COMMUNICATION SYSTEM USING THE UNIFIED FEEDBACK FRAME

CROSS-REFERENCE TO RELATED APPLICATION(S)

This application claims the benefit under 35 U.S.C. §119(e) of U.S. Provisional Application No. 61/303,341, filed on Feb. 11, 2010, in the U.S. Patent and Trademark Office, and the benefit under 35 U.S.C. §119(a) of Korean Patent Application No. 10-2010-0084669, filed on Aug. 31, 2010, in the Korean Intellectual Property Office, the entire disclosures of which are incorporated herein by reference for all purposes.

BACKGROUND

1. Field

The following description relates to a multiple-input multiple-output (MIMO) communication system that may provide a plurality of feedback modes.

2. Description of Related Art

A multiple-input multiple-output (MIMO) communication system may provide a variety of multimedia services in a wireless communication environment by employing a plurality of channels in a spatial area.

In the MIMO communication system, a base station and terminals may share channel information, and may use a codebook to generate an optimal precoding matrix. For example, the base station and the terminals may share the channel information using a plurality of codewords that are included in the codebook, and may generate an appropriate precoding matrix.

A particular space may be quantized to the plurality of codewords. The plurality of codewords generated by quantizing the particular space may be stored in the base station and the terminals as a form of the codebook. Each of the codewords may be a vector or a matrix.

SUMMARY

In one general aspect, there is provided a communication method of a transmitter in a multiple-input multiple-output (MIMO) communication system, the communication method comprising accessing a base codebook comprising base codewords and an additional codebook comprising additional codewords, receiving, from a receiver, a base codeword indicator that indicates one of the base codewords included in the base codebook and an additional codeword indicator that indicates one of the additional codewords included in the additional codebook, and generating a precoding matrix for the receiver using the base codeword indicator and the additional codeword indicator.

The additional codebook may comprise a differential codebook that comprises differential codewords.

The additional codebook may further comprise a correlation codebook that comprises correlation codewords.

The receiving may comprise receiving the base codeword indicator that indicates one of the base codewords included in the base codebook, a differential codeword indicator that indicates one of the differential codewords included in the differential codebook, and a correlation codeword indicator that indicates one of the correlation codewords included in the correlation codebook, and the generating may comprise generating the precoding matrix for the receiver using the base codeword indicator, the differential codeword indicator, and the correlation codeword indicator.

The generating may comprise refining the base codeword indicator using the differential codeword indicator, and performing an inner product between the base codeword indicator and the refined base codeword indicator to generate the precoding matrix for the receiver.

The differential codeword indicator may indicate a difference in a time domain with respect to the base codeword indicator or a difference in a frequency domain with respect to the base codeword indicator, and the correlation codeword indicator may indicate a correlation of a channel formed between the transmitter and the receiver.

When the differential codeword indicator is fixed as a predetermined matrix and the correlation codeword indicator is fixed as another predetermined matrix, the base codeword indicator may indicate one of the base codewords in a wideband comprising a plurality of sub-bands or may indicate one of the base codewords in a corresponding sub-band among the plurality of sub-bands.

When the differential codeword indicator is fixed as a predetermined matrix and the base codeword indicator indicates one of the base codewords in a wideband comprising a plurality of sub-bands or in a corresponding sub-band among the plurality of sub-bands, the generating may comprise adaptively adjusting the precoding matrix for the receiver using the correlation codeword indicator.

When the correlation codeword indicator is fixed as a predetermined matrix, the base codeword indicator indicates one of the base codewords in a wideband comprising a plurality of sub-bands or in a corresponding sub-band from among the plurality of sub-bands, and the differential codeword indicator indicates one of the differential codewords in the corresponding sub-band among the plurality of sub-bands, the generating may comprise refining the base codeword indicator using the differential codeword indicator to generate the precoding matrix for the receiver.

The base codeword indicator may indicate one of the base codewords in a wideband comprising a plurality of sub-bands or in a corresponding sub-band from among the plurality of sub-bands, and the differential codeword indicator may indicate one of the differential codewords in the corresponding sub-band from among the plurality of sub-bands, the receiving may comprise receiving the base codeword indicator and the differential codeword indicator in the same time interval, and the generating may comprise refining the base codeword indicator in a frequency domain using the differential codeword indicator to generate the precoding matrix for the receiver.

The base codeword indicator may indicate one of the base codewords in a wideband that comprises a plurality of sub-bands, and the differential codeword indicator may indicate one of the differential codewords in the corresponding sub-band from among the plurality of sub-bands, the receiving may comprise receiving each of the base codeword indicator and the differential codeword indicator in a different time interval, and the generating may comprise refining the base codeword indicator in both a time domain and a frequency domain using the differential codeword indicator to generate the precoding matrix for the receiver.

The base codeword indicator may indicate one of the base codewords in a corresponding sub-band from among a plurality of sub-bands, and the differential codeword indicator may indicate one of the differential codewords in the corresponding sub-band from among the plurality of sub-bands, the receiving may comprise receiving the base codeword indicator and the differential codeword indicator in the same time interval, and the generating may comprise refining the base codeword indicator in a frequency domain using the differential codeword indicator to generate the precoding matrix for the receiver.

The base codeword indicator may indicate one of the base codewords in a corresponding sub-band from among a plurality of sub-bands, and the differential codeword indicator may indicate one of the differential codewords in the corresponding sub-band from among the plurality of sub-bands, the receiving may comprise receiving each of the base codeword indicator and the differential codeword indicator at different time intervals, and the generating may comprise refining the base codeword indicator in a time domain using the differential codeword indicator to generate the precoding matrix for the receiver.

The receiving may comprise sequentially receiving one or more differential codeword indicators with respect to a single base codeword indicator.

In another aspect, there is provided a communication method of a receiver in a MIMO communication system, the communication method comprising estimating a channel formed between a transmitter and the receiver, accessing a base codebook comprising base codewords and an additional codebook comprising additional codewords, generating, based on the estimated channel, a base codeword indicator that indicates one of the base codewords included in the base codebook and an additional codeword indicator that indicates one of the additional codewords included in the additional codeword, and transmitting the base codeword indicator and the additional codeword indicator to the transmitter.

The additional codebook may comprise a differential codebook that comprises differential codewords.

The additional codebook may further comprise a correlation codebook that comprises correlation codewords.

The generating may comprise generating the base codeword indicator that indicates one of the base codewords included in the base codebook, a differential codeword indicator that indicates one of the differential codewords included in the differential codebook, and a correlation codeword indicator that indicates one of the correlation codewords included in the correlation codebook.

The base codeword indicator may indicate one of the base codewords in a wideband that comprises a plurality of sub-bands or in a corresponding sub-band from among the plurality of sub-bands, and the differential codeword indicator may indicate one of the differential codewords in the corresponding sub-band from among the plurality of sub-bands.

At least one of the differential codeword indicator and the correlation codeword indicator may be fixed as a predetermined matrix.

In another aspect, there is provided a transmitter supporting multiple feedback modes in a multiple-input multiple-output (MIMO) network, the transmitter comprising a memory configured to store at least a first mode codebook and a second mode codebook, a receiving unit configured to receive, from a receiver, a first codeword indicator that indicates a first codeword from among a plurality of codewords included in the first mode codebook, and a second codeword indicator that indicates a second codeword out of a plurality of codewords included in the second mode codebook, a precoding matrix generator configured to generate a precoding matrix for the receiver based on the first codeword indicator and the second codeword indicator, a precoder configured to precode at least one data stream using the generated precoding matrix, and a transmitting unit configured to transmit the precoded at least one data stream to the receiver.

The received first codeword indicator may indicate a base codeword from a base codebook recommended in a wideband that comprises a plurality of sub-bands, and the received second codeword indicator may indicate a differential codeword from a differential codebook recommended in a first sub-band out of the plurality of sub-bands in the wideband, and the precoding matrix generator may generate the precoding matrix by refining the received base codeword using the received differential codeword.

In another aspect, there is provided a receiver supporting multiple feedback modes in a multiple-input multiple-output (MIMO) network, the receiver comprising a channel estimator configured to estimate a channel formed between the receiver and a transmitter, a memory configured to store at least a first mode codebook and a second mode codebook, and an indicator generator configured to generate a first codeword indicator that indicates a first codeword out of a plurality of codewords included in the first mode codebook, and configured to generate a second codeword indicator that indicates a second codeword out of a plurality of codewords included in the second mode codebook, and a transmitting unit configured to transmit the first codeword indicator and the second codeword indicator to the transmitter.

The first codeword indicator may indicate a base codeword from a base codebook recommended in a wideband that comprises a plurality of sub-bands, and the second codeword indicator may indicate a differential codeword from a differential codebook recommended in a first sub-band out of the plurality of sub-bands in the wideband.

The transmitting unit may transmit the first codeword indicator at a first time interval and may transmit the second codeword indicator at a second time interval that is different from the first time interval.

The transmitting unit may transmit the first codeword indicator and the second codeword indicator at the same time interval.

Other features and aspects will be apparent from the following detailed description, the drawings, and the claims.

Figure 1:
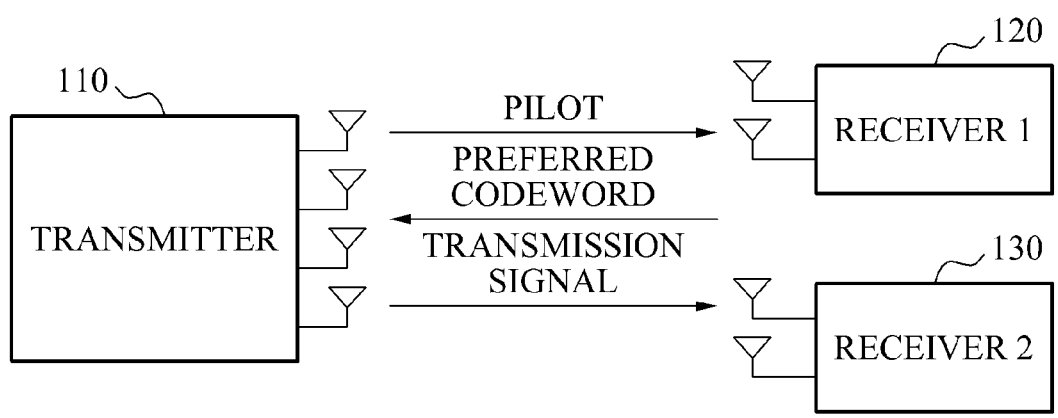
FIG. 1 is a diagram illustrating an example of a closed-loop multiple-input multiple-output (MIMO) communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

FIG. 1 illustrates an example of a closed-loop multiple input multiple output (MIMO) communication system.

Referring to FIG. 1, the closed-loop MIMO communication system includes a transmitter 110, a receiver (1) 120, and a receiver (2) 130. While FIG. 1 illustrates an example of a multi-user MIMO communication system, the following descriptions may also be applicable to a single-user MIMO communication system. The phrase 'closed-loop' indicates that each receiver (1) 120 and receiver (2) 130 may feed back channel information to the transmitter 110, and the transmitter 110 may perform precoding based on the channel information.

A plurality of transmit antennas, for example, two transmit antennas, four transmit antennas, eight transmit antennas, or other desired amount of transmit antennas, may be installed in the transmitter 110. At least one receive antenna may be installed in each of the receiver (1) 120 and the receiver (2) 130. A channel may be formed between the transmitter 110 and the receiver (1) 120. A channel may also be formed between the transmitter 110 and the receiver (2) 130. Each of the receiver (1) 120 and the receiver (2) 130 may feed back, to the transmitter 110, channel information associated with the respective channel. For example, the channel information may be generated based on different types of codebooks depending on feedback modes. As an example, the feedback modes may include a base mode, a differential mode, and a correlation mode.

As one example, when the transmitter 110, the receiver (1) 120, and the receiver (2) 130 operate based on the base mode, each of the receiver (1) 120 and the receiver (2) 130 may select one of a plurality of base codewords included in a base codebook corresponding to the base mode as a preferred base codeword, and may feed back, to the transmitter 110, a base codeword indicator corresponding to the preferred base codeword. For example, the receiver (1) 120 and the receiver (2) 130 may feed back an index of the preferred base codeword.

The transmitter 110 may recognize a base codeword indicator of each respective receiver (1) 120 and receiver (2) 130, based on a pre-stored base codebook. Accordingly, the transmitter 110 may determine an optimal precoding matrix for each respective receiver, based on the base codeword indicator received from each of the receiver (1) 120 and the receiver (2) 130. Data streams desired to be transmitted by the transmitter 110 may be precoded by a precoding matrix and may be transmitted to the receiver (1) 120 and the receiver (2) 130 via the transmit antennas installed in the transmitter 110.

For example, the transmitter 110 may determine an optimal precoding matrix for receiver (1) 120 based on the base codeword indicator fed back from the receiver (1) 120. The transmitter 110 may precode data to be transmitted to the receiver (1) 120 using the optimal precoding matrix determined for the receiver (1) 120. Then, the precoded data may be transmitted to the receiver (1) 120 via transmit antennas installed in the transmitter 110. Likewise, the transmitter may determine an optimal precoding matrix for the receiver (2) 130 based on the base codeword indicator fed back from the receiver (2) 130.

As another example, when the transmitter 110, the receiver (1) 120, and the receiver (2) 130 operate based on the differential mode, each of the transmitter 110, the receiver (1) 120, and the receiver (2) 130 may generate a differential codeword indicator based on a differential codebook corresponding to the differential mode. For example, the differential mode may include a differential mode in a frequency domain, a differential mode in a time domain, and a differential mode in both the frequency domain and the time domain. When the differential mode is enabled, for example, each of the receiver (1) 120 and the receiver (2) 130 may select a differential codeword from a plurality of differential codewords included in the differential codebook that may most well refine the preferred base codeword in the base mode. A differential codeword indicator corresponding to the selected differential codeword may be fed back to the transmitter 110. The transmitter 110 may refine the preferred base codeword, fed back from each of the receiver (1) 120 and the receiver (2) 130, in at least one of the time domain and the frequency domain using the differential codeword indicator, and may determine the optimal precoding matrix using the refined preferred base codeword.

As another example, when the transmitter 110, the receiver (1) 120, and the receiver (2) 130 operate based on the correlation mode, each of the transmitter 110, the receiver (1) 120, and the receiver (2) 130 may generate a correlation codeword indicator based on a correlation codebook corresponding to the correlation mode. For example, a channel formed between the transmitter 110 and the receiver (1) 120 may have a correlation property and a channel formed between the transmitter 110 and the receiver (2) 130 may have a correlation property. In the correlation mode, each of the transmitter 110, the receiver (1) 120, and the receiver (2) 130 may refine the preferred base codeword using the correlation property of the respective channel.

The base mode, the differential mode, and the correlation mode are further described later.

Figure 2:
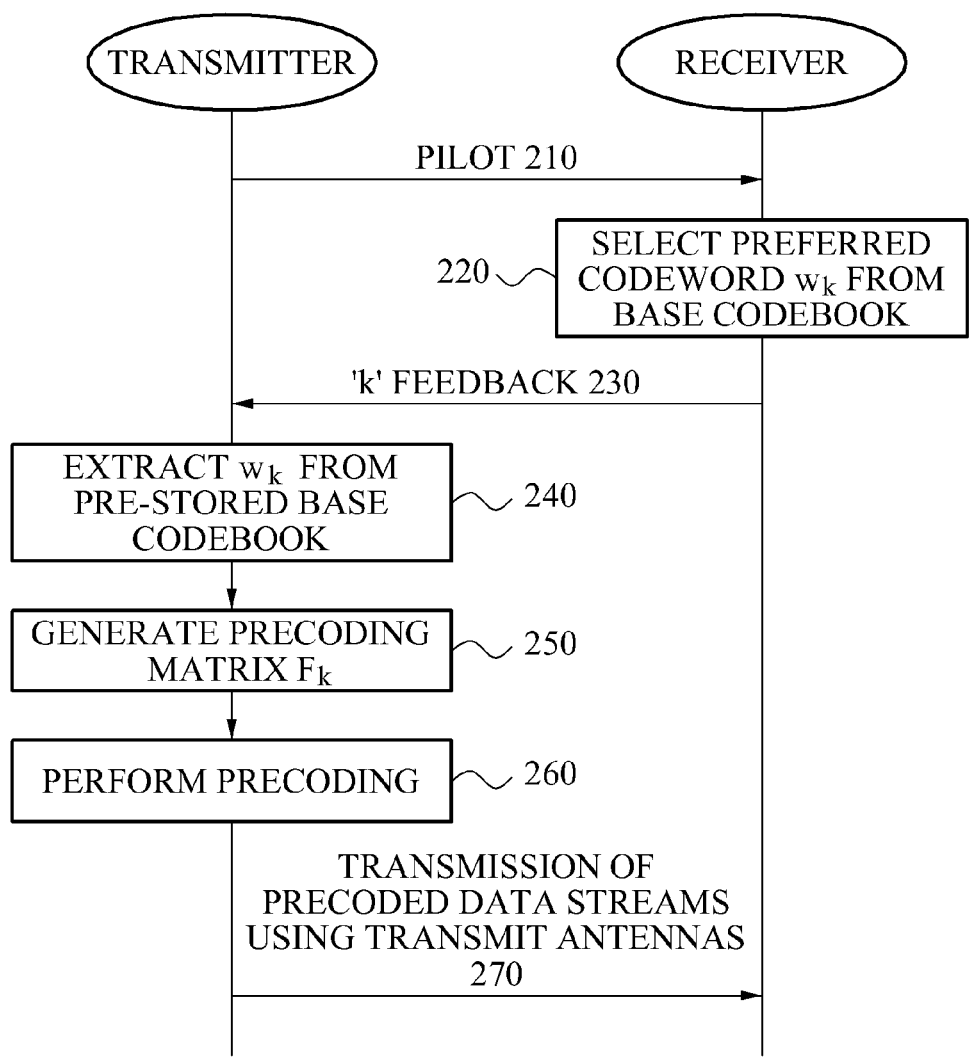
FIG. 2 is a diagram illustrating an example of a transmitter and a receiver configured to operate based on a base mode in a closed-loop MIMO communication system.

FIG. 2 illustrates an example of a transmitter and a receiver configured to operate based on a base mode in a closed-loop MIMO communication system.

Referring to FIG. 2, in 210, the transmitter transmits a pilot to the receiver. For example, the pilot may correspond to a signal known to both the transmitter and the receiver. The receiver may estimate a channel formed from the transmitter to the receiver using the received pilot.

In 220, in a base mode, the receiver selects one of a plurality of codewords included in a base codebook as a preferred base codeword $w_k$, based on the estimated channel. In this example, 'k' corresponds to an index of the preferred base codeword in the base codebook.

In 230, the receiver feeds back 'k' to the transmitter as a base codeword indicator. In 240, the transmitter extracts the preferred base codeword $w_k$ from a pre-stored base codebook. In 250, the transmitter generates a precoding matrix $F_k$ using the preferred base codeword $w_k$. In 260, the transmitter precodes data streams using the precoding matrix $F_k$. In 270, the precoded data streams are transmitted using transmit antennas.

Figure 3:
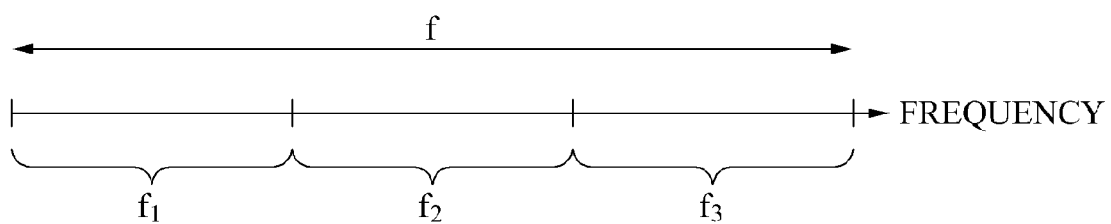
FIG. 3 is a diagram illustrating an example of a base codeword indicator in a wideband and a base codeword indicator in each sub-band.

FIG. 3 illustrates an example of a base codeword indicator in a wideband and a base codeword indicator in each sub-band.

Referring to FIG. 3, when a base mode is enabled, a single base codeword indicator may be generated in a wideband f, and a single base codeword indicator may be generated in each of sub-bands $f_1$, $f_2$, and $f_3$.

For example, a receiver may estimate a channel in the wideband f, and may select a single preferred base codeword in the wideband f based on the estimated channel. The receiver may estimate a channel in each of the sub-bands $f_1$, $f_2$, and $f_3$, and may select a single preferred base codeword in each of the sub-bands $f_1$, $f_2$, and $f_3$, based on the estimated channel.

Figure 4:
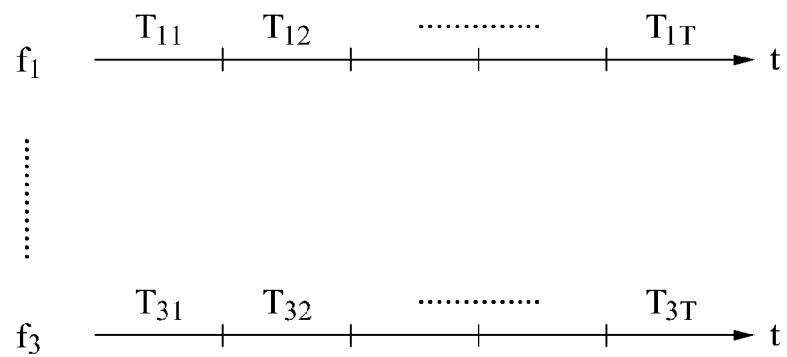
FIG. 4 is a diagram illustrating an example of a differential mode in a time domain.

FIG. 4 illustrates an example of a differential mode in a time domain.

For example, the differential mode may be enabled in the time domain.

Referring to FIG. 4, the differential mode in the time domain may be independently enabled in each sub-band $f_1, \ldots, f_3$. With respect to a given sub-band, a differential codeword indicator may be generated in each time interval. In FIG. 4, for example, $T_{jt}$ may be a differential codeword corresponding to a differential codeword indicator for sub-band j in the $t^{th}$ time interval.

For example, the receiver may sequentially generate differential codeword indicators in each of the sub-bands $f_1, \ldots, f_3$. For example, the receiver may sequentially generate differential codeword indicators corresponding to differential codewords $T_{11}, T_{12}, \ldots, T_{1T}$ in the sub-band $f_1$. The differential codeword indicator may be used to refine the base codeword $w_k$. As an example, a differential codeword $T_{jt}$ in the $t^{th}$ time interval may be used to refine the base codeword $w_k$, or to refine $T_{jt-1} w_k$ which is a multiplication of the base codeword $w_k$ and a differential codeword $T_{jt-1}$ of the $(t-1)^{th}$ time interval.

Similarly, the receiver may sequentially generate differential codeword indicators in each of remaining sub-bands. The differential codeword indicators generated in each of the sub-bands $f_1, \ldots, f_3$ may be sequentially fed back to the transmitter. Accordingly, the transmitter may generate a precoding matrix based on the differential codeword indicator, for example, by refining the base codeword $w_k$ or by refining a multiplication of the base codeword $w_k$ and a differential codeword of a previous time interval, using codewords corresponding to the sequentially fed back differential codeword indicators.

Figure 5:
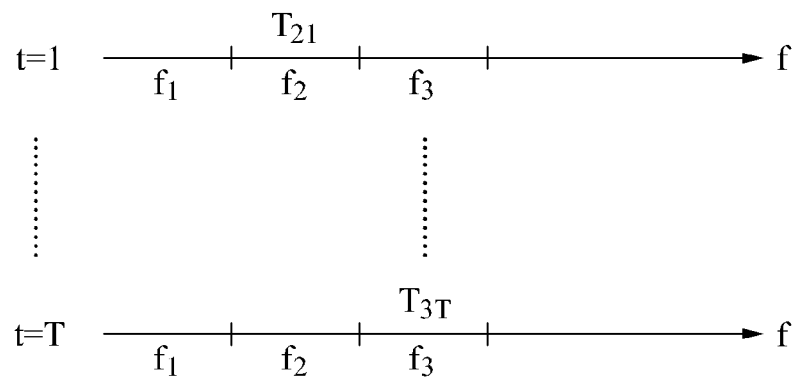
FIG. 5 is a diagram illustrating an example of a differential mode in a frequency domain.

FIG. 5 illustrates an example of a differential mode in a frequency domain.

Referring to FIG. 5, when the differential mode in the frequency domain is enabled, a receiver may generate a differential codeword indicator in at least one of the sub-bands $f_1$, $f_2$, and $f_3$ with respect to a given time interval.

As shown in FIG. 5, for example, the receiver may generate a differential codeword indicator corresponding to a differential codeword $T_{12}$ in the sub-band $f_2$ of the given time interval t=1. The receiver may generate a differential codeword indicator in other sub-bands of the given time interval t=1. The receiver may generate a differential codeword indicator in at least one of the sub-bands $f_1$, $f_2$, and $f_3$ with respect to other given time intervals t=2, ..., T.

In this example, the transmitter and the receiver may refine the base codeword using the differential codeword of the given time interval and generate the precoding matrix in a corresponding sub-band using the refined base codeword.

Figure 6:
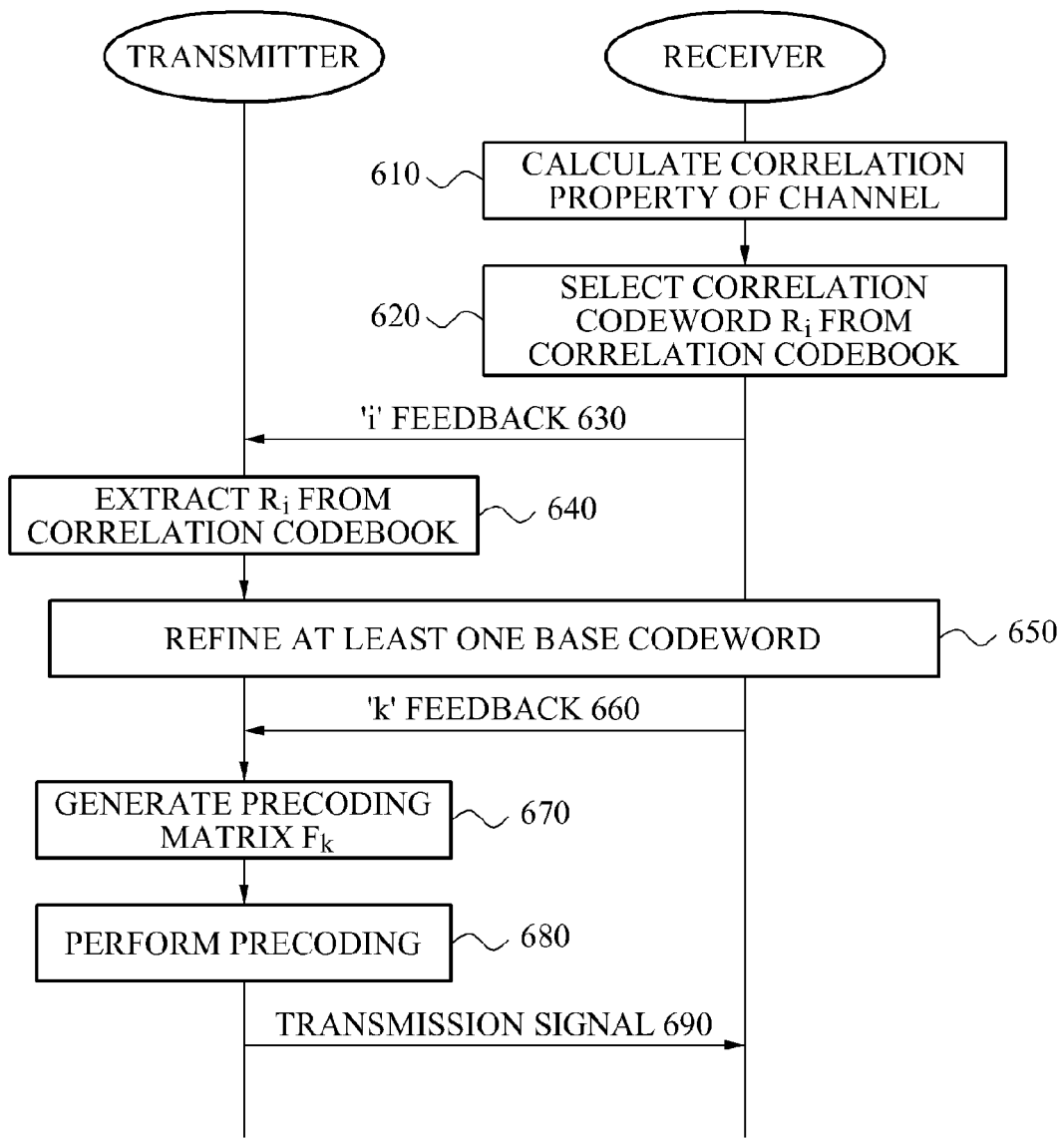
FIG. 6 is a diagram illustrating an example of a transmitter and a receiver configured to operate based on a correlation mode in a closed-loop MIMO communication system.

FIG. 6 illustrates an example of a transmitter and receiver configured to operate based on a correlation mode in a closed-loop MIMO communication system.

Referring to FIG. 6, when the correlation mode is enabled, in 610 the receiver calculates a correlation property of a channel. For example, the correlation property of the channel may be calculated in a wideband and may also be calculated as long term information. Examples of calculating the correlation property of the channel are described later.

In 620, the receiver selects a correlation codeword $R_i$ from a correlation codebook, based on the correlation property of the channel. The correlation codebook may include a plurality of correlation codewords. For example, the receiver may select the correlation codeword $R_i$ that best expresses the correlation property of the channel.

In 630, the receiver feeds back a correlation codeword indicator to the transmitter. For example, the receiver may feed back 'i' that is an index of the correlation codeword $R_i$.

In 640, the transmitter extracts the correlation codeword $R_i$ from the correlation codebook using the correlation codeword indicator i. For example, the transmitter may extract the correlation codeword $R_i$ corresponding to the correlation codeword indicator i, from among a plurality of correlation codewords included in the correlation codebook.

In 650, the transmitter and the receiver refine at least one base codeword included in the base codebook using the correlation codeword $R_i$. For example, all of base codewords may be refined based on the correlation property of the channel.

Although not illustrated in FIG. 6, the receiver may select one of the refined base codewords included in the base codebook as a refined preferred base codeword $w_k$. In 660, the receiver feeds back an index of the refined preferred base codeword to the transmitter. For example, the receiver may feed back 'k' that is an index of the refined preferred base codeword $w_k$.

In 670, the transmitter generates a precoding matrix using the refined preferred base codeword. For example, the transmitter may generate a precoding matrix $F_k$ using the refined preferred base codeword $w_k$. The transmitter performs precoding, in 680. In 690, precoded transmission signals are transmitted using a plurality of transmit antennas.

The base mode, the differential mode, and the correlation mode will be described. A unified version of the base mode, the differential mode, and the correlation mode will be described. For example, the base mode, the differential mode, and the correlation mode may be enabled through a unified feedback frame.

In this example, the number of transmit antennas is $N_t$ and a rank is r. An overall recommended precoding matrix $F_{i,j_1,\ldots,j_T,k}$ may have a size of $N_t \times r$, and may be expressed by $$F_{i,j_1,\ldots,j_T,k} = R_i \Omega(T_{j_T} T_{j_{T-1}} \ldots T_{j_2} T_{j_1} W_k)$$

In this example, $\Omega(T_{j_T}, T_{j_{T-1}} \ldots T_{j_2} T_{j_1} W_k)$ may correspond to a function of recommended differential codewords $T_{j_T}, T_{j_{T-1}} \ldots T_{j_2} T_{j_1} W_k$, and $W_k$ corresponds to a recommended base codeword.

For example, two structures may be proposed as follows:

Structure 1:

$$\Omega(T_{j_T}, T_{j_{T-1}}, \ldots, T_{j_2}T_{j_1}W_k) = T_{j_T} \ldots T_{j_2}T_{j_1}W_k \text{ such that}$$

$$F_{i,j_1,\ldots,j_T,k} = R_i \prod_{t=1}^{T} T_{j_t} W_k = R_i T_{j_T} \ldots T_{j_2} T_{j_1} W_k$$

Structure 2:

$$\Omega(T_{j_T}, T_{j_{T-1}}, \ldots, T_{j_2}T_{j_1}W_k) = Q(T_{j_{T-1}}, \ldots, T_{j_2}, T_{j_1}, W_k)T_{j_T}$$

such that $$F_{i,j_1,\ldots,j_T,k} = R_i Q(T_{j_{T-1}}, \ldots, T_{j_2}, T_{j_1}, W_k)T_{j_T}$$

In this example, Q corresponds to a matrix that is generated based on $T_{j_{T-1}}, \ldots, T_{j_2}, T_{j_1}$, and $W_k$.

In the above Equation, 'i' corresponds to an index of a recommended codeword from among a plurality of correlation codewords included in a correlation codebook, $j_t$ (t=1, 2, ..., T) corresponds to an index of a recommended differential codeword from among a plurality of differential codewords included in a differential codebook, and 'k' corresponds to an index of a recommended base codeword from among a plurality of base codewords included in a base codebook.

1. Base codebook and recommended base codeword $W_k$:

$W_k$ corresponds to the $k^{th}$ base codeword in the base codebook, and may have a size of $N_t \times r$. The base codebook may be defined in various types of standards such as $3^{rd}$ Generation Partnership Project (3GPP) Long Term Evolution (LTE) Release 8-10, and may be a codebook for two transmit antennas, four transmit antennas, eight transmit antennas, or any number of antennas. $W_k$ may be recommended in an overall wideband, and may also be recommended in at least one of a plurality of sub-bands included in the wideband. Whether $W_k$ is recommended in the overall wideband or in one of the sub-bands may vary depending on an operation mode or a scenario.

2. Differential codebook and recommended differential codeword $T_{j_t}$:

In this example, $T_{j_t}$ corresponds to one differential codeword included in the differential codebook. The recommended differential codeword $T_{j_t}$ may be used to refine the recommended base codeword $W_k$ in the sub-band or in a short term time. For example, when the recommended base codeword $W_k$ is recommended in the wideband, the differential codeword $T_{j_t}$ may be recommended in one sub-band from among the plurality of sub-bands included in the wideband, and thus, may express a difference in a frequency domain with respect to $W_k$. When the recommended base codeword $W_k$ is recommended in a time interval t=0, $T_{j_t}$ may be recommended in the time interval 't', and thus, may express a difference in a time domain with respect to $W_k$.

In this example, it may correspond to a unitary matrix having a size of $N_t \times N_t$ in the aforementioned structure 1, and may be fixed as a unitary matrix having a size of $N_t \times r$ in the aforementioned structure 2. $T_{j_t}$ may be fixed as an identity matrix with respect to all 't' in structure 1. Similarly, $T_{j_t}$ may be selected to guarantee $Q(T_{j_{T-1}}, \ldots, T_{j_2}, T_{j_1}, W_k)T_{j_T} = W_k$ in structure 2.

When $T_{j_t}$ is fixed as the identity matrix or is selected to guarantee $Q(T_{j_{T-1}}, \ldots, T_{j_2}, T_{j_1}, W_k)T_{j_T} = W_k$, $T_{j_t}$ may be assumed as a pre-fixed matrix A. In this example, additional refinement in a short term level or the sub-band level may not be used.

In addition, $T_{j_t}$ enables a differential codebook-based feedback in the time domain or in the frequency domain to be performed. Depending on whether $W_k$ and $T_{j_t}$ are fed back in the same time interval or in different time intervals, the following two cases may be induced:

(1) An example where $W_k$ and $T_{j_t}$ are fed back in the same time interval:

1) When $W_k$ and $T_{j_t}$ are fed back in the same time interval, $W_k$ may be recommended in the wideband and may be selected from the base codebook. With respect to structure 1, when T=1, for example, when a single $W_k$ in each of sub-bands is refined by only a single $T_{j_t}$, $$F_{i,j_1,k} = R_i \prod_{t=1}^{T} T_{j_t} W_k = R_i T_{j_1} W_k.$$

Similarly, with respect to structure 2, $F_{i,j_1,k} = R_i Q(W_k)T_{j_1}$. In this example, when T=2, $F_{i,j_1,k} = R_i T_{j_1} W_k$ and $F_{i,j_1,j_2,k} = R_i T_{j_2} T_{j_1} W_k$ with respect to structure 1. For example, in a time interval t=2, the single $W_k$ in each of the sub-bands may be refined by two $T_{j_t}$.

$T_{j_t}$ corresponds to a recommended differential codeword in a corresponding sub-band, and may be used to provide additional sub-band-wise information associated with channel state information with respect to $W_k$ recommended in the wideband. The differential codebook enables a differential feedback in the frequency domain to be operated.

Example 1

In a given time interval (e.g., t=0, t=1, ...), an index k of $W_k$ recommended in the wideband may refer to the $k^{th}$ base codeword in the base codebook. In the given time interval, $W_k$ may be refined by $T_j$ in each of a plurality of sub-bands. For example, an index of $T_j$ in each of the sub-bands may be fed back in the same time interval.

An example of $W_k$ and $T_{j_t}$ being fed back in the same time interval and a single $W_k$ is refined by a single $T_{j_t}$ in a given sub-band is described with reference to FIG. 7.

Figure 7:
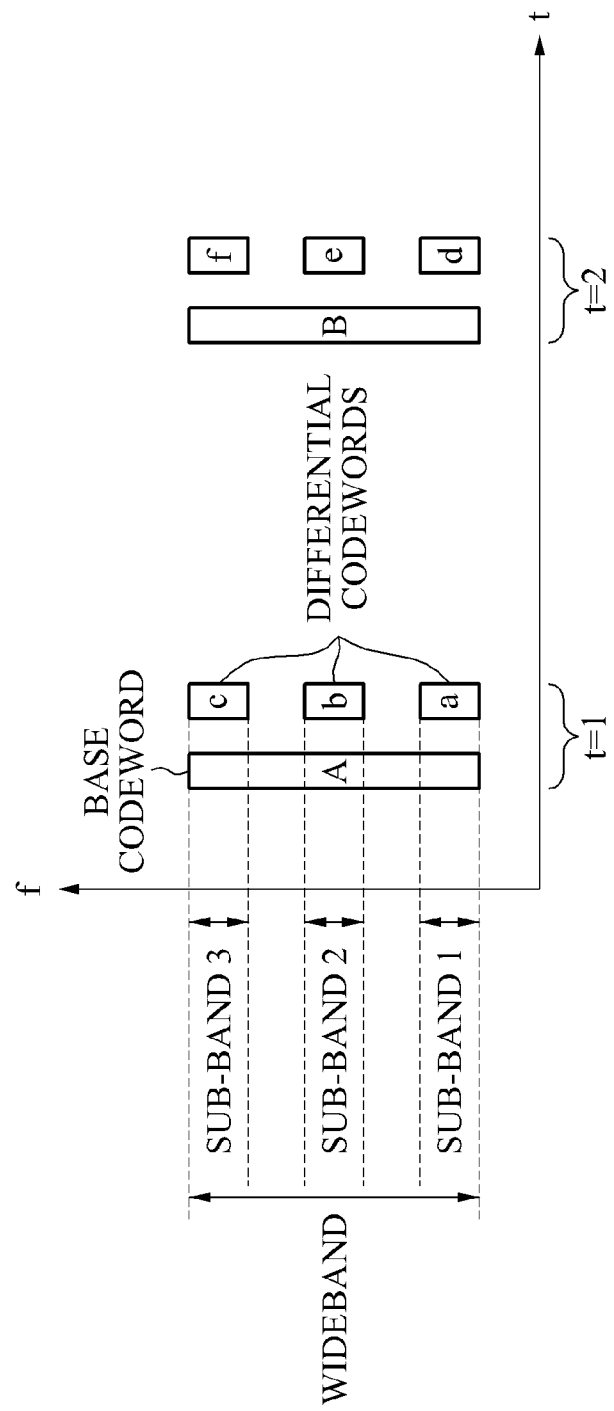
FIG. 7 is a diagram illustrating an example of a base codeword in a wideband and differential codewords in sub-bands.

FIG. 7 illustrates an example of a base codeword in a wideband and differential codewords in sub-bands.

Referring to FIG. 7, for example, an indicator indicating a base codeword A recommended in a wideband may be fed back from a receiver to a transmitter in the time interval t=1. For example, in the time interval t=1, an indicator indicating a differential codeword 'a' recommended in the sub-band 1, an indicator indicating a differential codeword 'b' recommended in the sub-band 2, and an indicator indicating a differential codeword 'c' recommended in the sub-band 3 may be fed back. The recommended differential codewords 'a', 'b', and 'c' may be used to refine the base codeword A of the wideband in the corresponding sub-bands 1, 2, and 3, respectively.

As another example, in the time interval t=2, an indicator indicating a base codeword B recommended in the wideband may be fed back from the receiver to the transmitter. Similarly to the time interval t=1, in the time interval t=2, an indicator indicating a differential codeword 'd' recommended in the sub-band 1, an indicator indicating a differential codeword 'e' recommended in the sub-band 2, and an indicator indicating a differential codeword 'f' recommended in the sub-band 3 may be fed back. The recommended differential codewords 'd', 'e', and 'f' may be used to refine the base codeword B of the wideband in the corresponding sub-bands 1, 2, and 3, respectively.

2) An example where the recommended base codeword $W_k$ is generated in the wideband and a recommended differential codeword is used to refine the recommended base codeword $W_k$ in the sub-band:

Hereinafter, an example in which each recommended base codeword $W_k$ is generated in each sub-band, and each of recommended differential codewords is used to refine each corresponding base codeword $W_k$ recommended in each of the corresponding sub-bands is described. With respect to structure 1, T=1 (a single $W_k$ in each of sub-bands is refined by a single $T_{j_t}$) may be assumed. Similarly, with respect to structure 2, $F_{i,j_1,k} = R_i Q(W_k) T_{j_1}$ may be assumed.

$T_{j_1}$ in each of the sub-bands may be used to refine $W_k$ in each of the sub-bands instead of refining $W_k$ in the wideband. This example is further described with reference to FIG. 7.

Example 2

Figure 8:
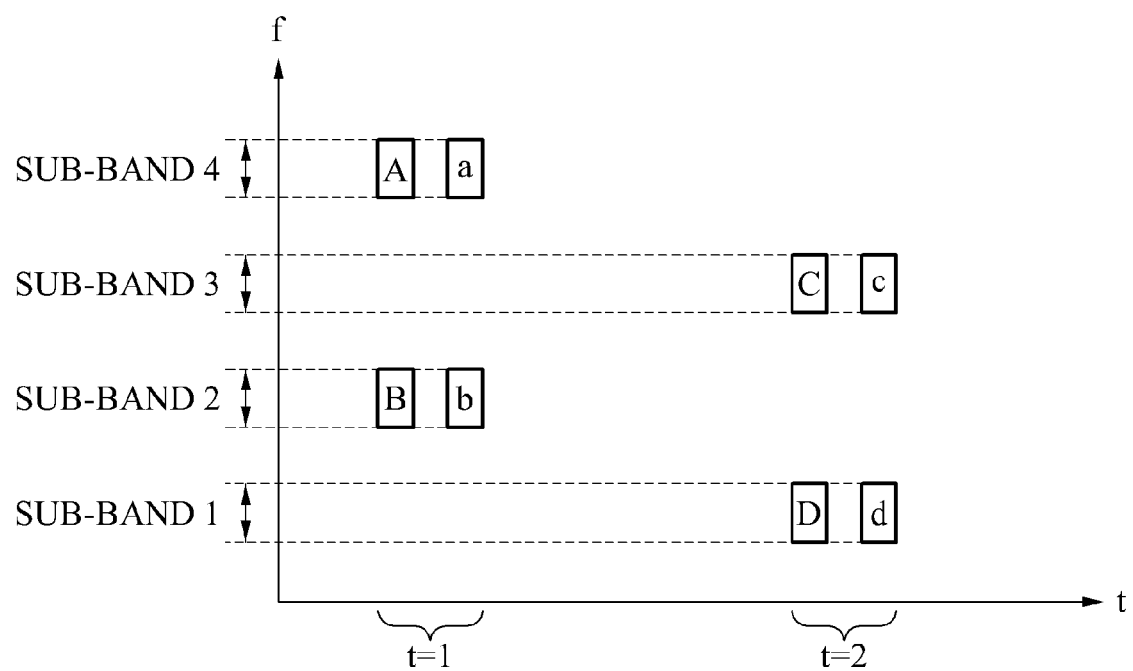
FIG. 8 is a diagram illustrating an example of base codewords and differential codewords in sub-bands.

FIG. 8 illustrates an example of base codewords and differential codewords in sub-bands.

Referring to the example of FIG. 8, in the time interval t=1, a receiver may feed back, to a transmitter, an index of a base codeword B recommended in the sub-band 2 and an index of a base codeword A recommended in the sub-band 4. In the same time interval t=1, the receiver may feed back, to the transmitter, an index of a differential codeword 'b' recommended in the sub-band 2 and an index of a differential codeword 'a' recommended in the sub-band 4. For example, the transmitter may generate a precoding matrix in the sub-band 4 by refining the recommended base codeword A using the differential codeword 'a'. Similarly, the transmitter may generate a precoding matrix in the sub-band 2 by refining the recommended base codeword B using the differential codeword 'b'.

In the time interval t=2, the receiver may feed back, to the transmitter, an index of a base codeword D recommended in the sub-band 1 and an index of a base codeword C recommended in the sub-band 3. In the same time interval t=2, the receiver may feed back, to the transmitter, an index of a differential codeword 'd' recommended in the sub-band 1 and an index of a differential codeword 'c' recommended in the sub-band 3. For example, the transmitter may generate the precoding matrix in the sub-band 3 by refining the recommended base codeword C using the differential codeword 'c'. Similarly, the transmitter may generate the precoding matrix in the sub-band 1 by refining the recommended base codeword D using the index of the differential code word 'd'.

(2) An example where $W_k$ and $T_{j_t}$ are fed back in different time intervals:

In this example, $W_k$ and $T_{j_t}$ may be fed back in different time intervals. A feedback interval of each of $W_k$ and $T_{j_t}$ may also be different.

As one example, when $W_k$ is generated in the wideband and T=1, it may be inefficient to feed back an index of $W_k$ as frequently as an index of the differential codeword $T_{j_t}$ recommended in the sub-band. For example, the index of $W_k$ may be fed back less frequently than compared to the index of $T_{j_t}$.

As another example, when $W_k$ is generated in the sub-band, it may be efficient for $T_{j_t}$ to successively refine $W_k$. For example, when T=2, $T_{j_1}$ may refine $W_k$ and $T_{j_2}$ may refine not $W_k$ but $T_{j_1} W_k$.

Hereinafter, the aforementioned two examples are further described:

1) $W_k$ may be assumed as a recommended base codeword generated in a wideband. When T=1, $$F_{i,j_1,k} = R_i \prod_{t=1}^{T} T_{j_t} W_k = R_i T_{j_1} W_k$$

with respect to structure 1 and $F_{i,j_1,k} = R_i Q(W_k) T_{j_1}$ respect to structure 2. $T_{j_1}$ corresponds to a differential codeword recommended in a corresponding sub-band, and may provide additional sub-band-wise information with respect to $W_k$.

When T is great enough, $$F_{i,j_1,\ldots,j_T,k} = R_i \prod_{t=1}^{T} T_{j_t} W_k = R_i T_{j_T} \ldots T_{j_2} T_{j_1} W_k$$

may be obtained with respect to structure 1 and $F_{i,j_1,\ldots,j_T,k} = R_i Q(T_{j_{T-1}}, \ldots, T_{j_2}, T_{j_1}, W_k) T_{j_T}$ may be obtained with respect to structure 2. In this example, $T_{j_t}$ may provide additional sub-band-wise information with respect to $T_{j_{T-1}} \ldots T_{j_2} T_{j_1} W_k$ in structure 1, and may provide additional sub-band-wise information with respect to $Q(T_{j_{T-2}}, \ldots, T_{j_2}, T_{j_1}, W_k) T_{j_{T-1}}$ in structure 2.

For example, $T_{j_1}, T_{j_2}, \ldots, T_{j_{t-1}},$ and $T_{j_t}$ may be selected from the differential codebook, and each of $W_k, T_{j_1}, T_{j_2}, \ldots, T_{j_{t-1}},$ and $T_{j_t}$ may be fed back in a different time interval. In this example, T may define a number of differential operations in a time domain differential feedback.

According to various examples, it is possible to operate a differential feedback in both a frequency domain and a time domain. For example, $T_{j_t}$ in a corresponding sub-band may refine $W_k$ in the wideband, and thus, the differential feedback in the frequency domain may be configured. For example, $W_k$ in the wideband and $T_{j_t}$ in the corresponding sub-band may be fed back in different time intervals, and thus, the differential feedback in the time domain may be configured.

Figure 9:
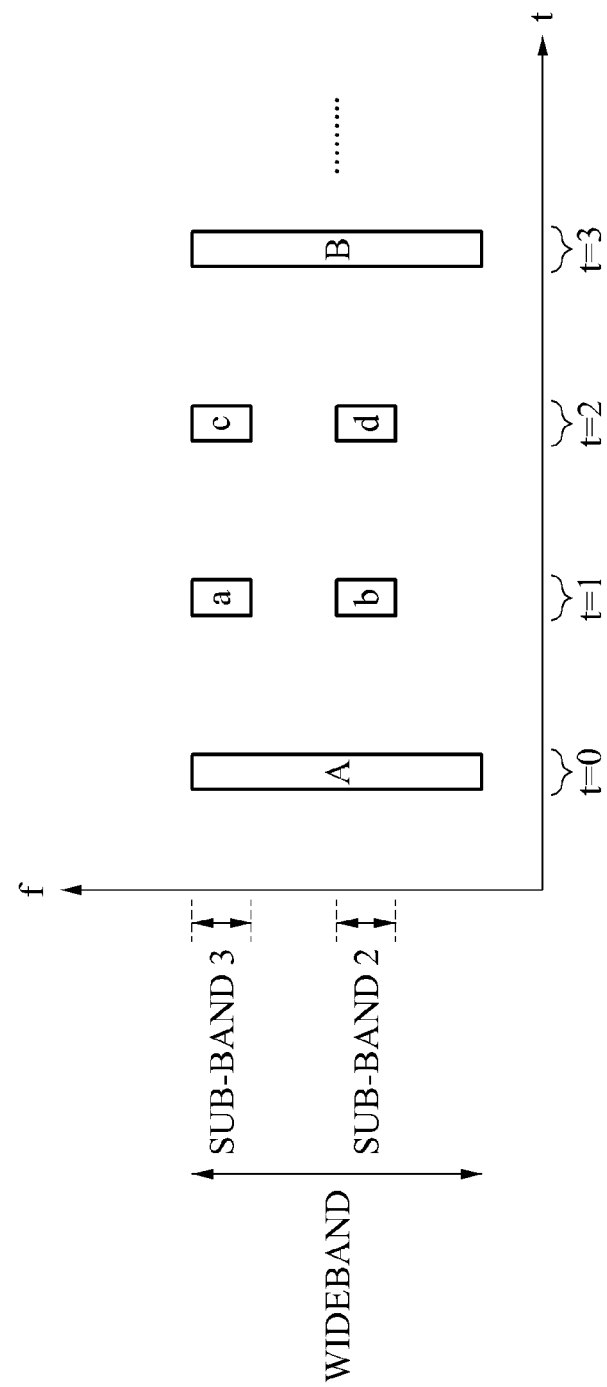
FIG. 9 is a diagram illustrating an example of a base codeword in a wideband and differential codewords in sub-bands.

FIG. 9 illustrates an example of a base codeword in a wideband and differential codewords in sub-bands.

Example 3

In this example, T=1 may be assumed. Referring to FIG. 9, in a given time interval such as t=0, an index of a recommended base codeword A may be fed back from a receiver to a base station. In the time interval t=0, the base station may generate a precoding matrix based on the recommended base codeword A.

When the recommended base codeword A fed back in the time interval t=0 is stable in the time domain, an index of a base codeword recommended in a time interval t=1 may not be fed back. For example, in the time interval t=1, only indexes of differential codewords 'a' and 'b' recommended in sub-bands 3 and 2 to refine the recommended base codeword A, may be fed back. Accordingly, the transmitter may refine the recommended base codeword A using each of the differential codewords 'a' and 'b' recommended in the sub-bands 3 and 2, and may generate a precoding matrix in each of the sub-bands 3 and 2.

Example 4

The recommended differential codewords may successively refine the base codeword A, which may correspond to a case in which T is greater than one. This example is further described.

When the recommended base codeword A fed back in the time interval t=0 is stable in the time domain, an index of a base codeword recommended in the time interval t=1 may not be fed back. For example, in the time interval t=1, only indexes of differential codewords 'a' and 'b' recommended in the sub-bands 3 and 2 to refine the recommended base codebook A may be fed back. In this example, the transmitter may refine the base codeword A using each of the differential codewords 'a' and 'b' recommended in the sub-bands 3 and 2, and may generate a precoding matrix in each of the sub-bands 3 and 2.

In the time interval t=2, an index of a recommended base codeword may not be fed back. In the time interval t=2, only indexes of differential codewords 'c' and 'd' in the sub-bands 3 and 2 to refine aA or bA instead of refining the recommended base codeword A may be fed back. Similarly, the transmitter may refine not the recommended base codeword A but instead may refine aA or bA using each of the differential codewords 'c' and 'd' recommended in the sub-bands 3 and 2, and may generate a precoding matrix in each of the sub-bands 3 and 2.

2) The recommended base codeword $W_k$ may be generated in a corresponding sub-band. $T_{j_t}$ may refine $T_{j_{T-1}} \ldots T_{j_2} T_{j_1} W_k$ in the sub-band in structure 1, or may refine $Q(T_{j_{T-2}}, \ldots, T_{j_2}, T_{j_1}, W_k) T_{j_{T-1}}$ in the sub band in structure 2, and thus, may provide additional sub-band-wise information.

$T_{j_1}, T_{j_2}, \ldots, T_{j_{T-1}}$, and $T_{j_t}$ may be selected from the differential codebook, and each of $W_k, T_{j_1}, \ldots, T_{j_2}, T_{j_{t-1}}$, and $T_{j_t}$ may be fed back in a different time interval for differential feedback in the time domain. In this example, T may define a number of differential operations in a time domain differential feedback.

For example, when T=1, only a single differential feedback may exist. When each of $W_k$ and $T_{j_1}$ is fed back in the different time interval, additional time-wise information associated with channel state information of $W_k$ may be provided. In this example, $W_k$ may refer to the sub-band in a time interval t−1 and may be represented by $V_{t-1}$. When $T_j$ is selected from the differential codebook in the time interval t, a precoding matrix recommended in the time interval t in a corresponding sub-band may be represented by $T_j V_{t-1}$.

3. Correlation codebook and recommended correlation codeword $R_i$:

$R_i$ may correspond to the i$^{th}$ correlation codeword included in the correlation codebook, and may consider a correlation property of a channel. $R_i$ may have a size of $N_t \times N_t$. In addition, $R_i$ may be generated in the wideband and may correspond to long term information associated with the correlation property of the channel.

An x-root of a correlation matrix $R_t$ of a channel matrix may be used. In this example, x=½ or 1. When x=½, $R_i$ may be represented as a quantized version of $R_t^{1/2}$. A projection of $T_j W_k$ along $F_{i,j,k} = R_i T_j W_k$ may rotate and scale channel state information in a short term or channel state information in a corresponding sub-band as a function of a long term correlation matrix or a wideband correlation matrix.

Accordingly, $S_{j,k} = T_j W_k$ may be a precoding matrix recommended in the corresponding sub-band, or a precoding matrix recommended in the short term. When $R_i$ is selected as a quantized version of $R_t^{1/2}$, $F_{i,j,k} = R_i S_{j,k}$ may indicate an adaptive precoding matrix. $R_i$ may be selected as an identity matrix.

The aforementioned examples may be arranged as shown on the following table. When $T_{j_t} = A$ with respect to all 't', a matrix A may be defined as the differential codeword existing in the differential codebook to establish $Q(T_{j_{T-1}}, \ldots, T_{j_2}, T_{j_1}, W_k) T_{j_T} = W_k$ in structure 2. In structure 1, $A = I_{n_t}$, may be defined.

| | | Achievable schemes |
|---|---|---|
| $T_{j_1} = \ldots = T_{j_T} = A$ and $R_i = I_{n_t}$ | Wideband $W_k$ | Recommend precoding matrix in wideband |
| | Sub-band $W_k$ | Recommend precoding matrix in corresponding sub-band |
| $T_{j_1} = \ldots = T_{j_T} = A$ and $R_i \neq I_{n_t}$ | Wideband or sub-band $W_k$ | Adaptive precoding matrix according to adaptive feedback mode |
| $T_{j_1} \neq A$, T = 1, and $R_i = I_{n_t}$ | When wideband $W_k$ and sub-band $T_{j_1}$ are fed back in the same time interval | Differential feedback in frequency domain |
| | When wideband $W_k$ and sub-band $T_{j_1}$ are fed back in different time intervals | Differential feedback in both frequency domain and time domain |
| | When sub-band $W_k$ and sub-band $T_{j_1}$ are fed back in the same time interval | Increase accuracy of feedback |
| | When sub-band $W_k$ and sub-band $T_{j_1}$ are fed back in the same time interval | Differential feedback in time domain |
| $T_{j_t} \neq A$ with t = 1 \ldots T, T > 1, and $R_i = I_{n_t}, j = k$ | When wideband $W_k$ and sub-band $T_{j_1}$ are fed back in different time intervals | Differential feedback in time domain |
| | When sub-band $W_k$ and sub-band $T_{j_1}$ are fed back in different time intervals | Differential feedback in time domain |

-continued

| | Achievable schemes | |
|---|---|---|
| $T_{j_t} \neq A$ with $t = 1 \ldots T, T > 1,$ and $R_i \neq I_{n_t}$ | Wideband or sub-band $W_k$ | Joint of adaptive feedback mode and differential feedback mode |

Figure 10:
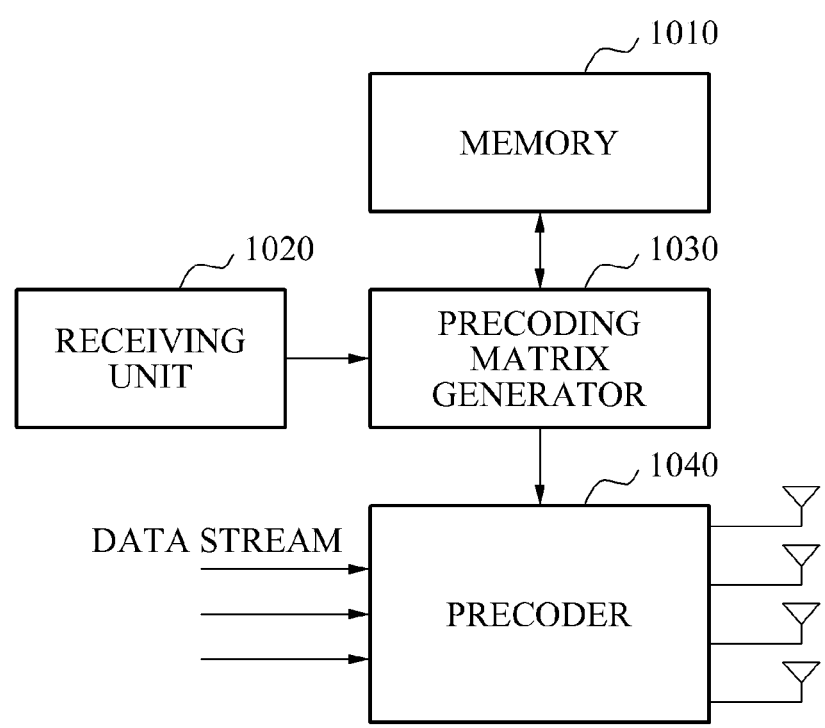
FIG. 10 is a diagram illustrating an example of a transmitter.

FIG. 10 illustrates an example of a transmitter.

Referring to FIG. 10, the transmitter includes a memory 1010, a receiving unit 1020, a precoding matrix generator 1030, and a precoder 1040.

The memory 1010 may store data such as a base codebook, a differential codebook, and a correlation codebook.

The receiving unit 1020 may receive, from a receiver, a base codeword indicator that indicates one of a plurality of base codewords included in the base codebook, a differential codeword indicator that indicates one of a plurality of differential codewords included in the differential codebook, and/or a correlation codeword indicator that indicates one of a plurality of correlation codewords included in the correlation codebook.

The precoding matrix generator 1030 may generate a precoding matrix for the receiver using at least one of the base codeword indicator, the differential codeword indicator, and the correlation codeword indicator.

The precoder 1040 may precode at least one data stream using the generated precoding matrix, and the precoded at least one data stream may be transmitted via a plurality of transmit antennas.

Descriptions made above with reference to FIG. 1 through FIG. 9 are applicable to the transmitter of FIG. 10, and thus, further description is omitted here.

Figure 11:
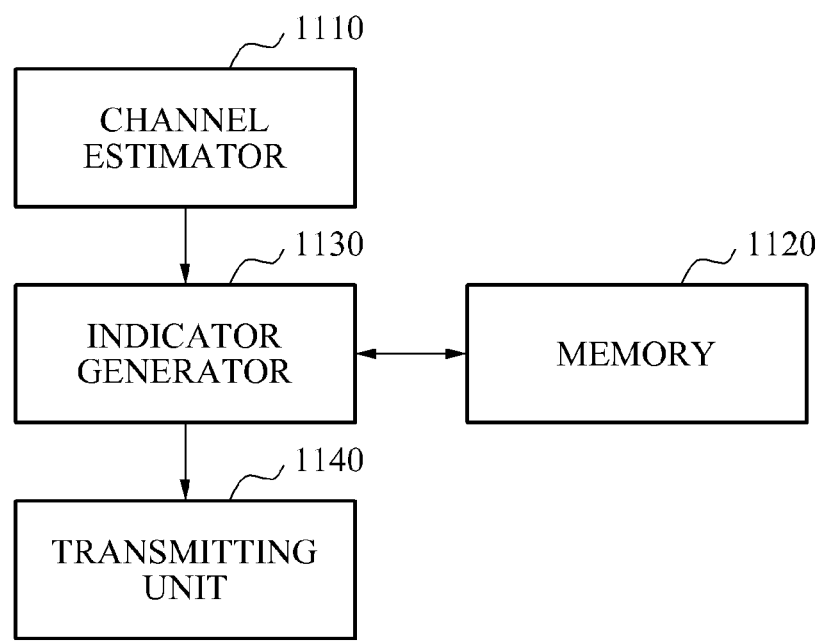
FIG. 11 is a diagram illustrating an example of a receiver.

FIG. 11 illustrates an example of a receiver.

Referring to FIG. 11, the receiver includes a channel estimator 1110, a memory 1120, an indicator generator 1130, and a transmitting unit 1140.

The channel estimator 1110 may estimate a channel formed from a transmitter to the receiver using a pilot that is received from the transmitter.

The memory 1120 may store a base codebook, a differential codebook, and a correlation codebook.

The indicator generator 1130 may generate, based on the estimated channel, a base codeword indicator that indicates one of a plurality of base codewords included in the base codebook, a differential codeword indicator that indicates one of a plurality of differential codewords included in the differential codebook, and/or a correlation codeword indicator that indicates one of a plurality of correlation codewords included in the correlation codebook.

The base codeword indicator, the differential codeword indicator, and/or the correlation codeword indicator may be transmitted to the transmitter via the transmitting unit 1140.

Descriptions made above with reference to FIG. 1 through FIG. 9 are applicable to the receiver of FIG. 11, and thus, further description is omitted here.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device, the transmitter, and/or the receiver described herein may refer to mobile devices such as a cellular phone, a personal to digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a transmitter in a multiple-input multiple-output (MIMO) communication system, the communication method comprising:

accessing a base codebook comprising base codewords and an additional codebook comprising additional codewords;

receiving, from a receiver, a base codeword indicator that indicates one of the base codewords included in the base codebook recommended for a wideband and an additional codeword indicator that indicates one of the additional codewords included in the additional codebook recommended for a sub-band from among a plurality of sub-bands included in the wideband; and generating a precoding matrix for the receiver in the sub-band using the base codeword indicator recommended for the wideband and the additional codeword indicator recommended for the sub-band.

2. The communication method of claim 1, wherein the additional codebook comprises a differential codebook that comprises differential codewords.

3. The communication method of claim 2, wherein the additional codebook further comprises a correlation codebook that comprises correlation codewords.

4. The communication method of claim 3, wherein:
the receiving comprises receiving the base codeword indicator that indicates one of the base codewords included in the base codebook, a differential codeword indicator that indicates one of the differential codewords included in the differential codebook, and a correlation codeword indicator that indicates one of the correlation codewords included in the correlation codebook, and
the generating comprises generating the precoding matrix for the receiver using the base codeword indicator, the differential codeword indicator, and the correlation codeword indicator.

5. The communication method of claim 3, wherein:
the differential codeword indicator indicates a difference in a time domain with respect to the base codeword indicator or a difference in a frequency domain with respect to the base codeword indicator, and
the correlation codeword indicator indicates a correlation of a channel formed between the transmitter and the receiver.

6. The communication method of claim 3, wherein, when the differential codeword indicator is fixed as a predetermined matrix and the correlation codeword indicator is fixed as another predetermined matrix, the base codeword indicator indicates one of the base codewords in a wideband comprising a plurality of sub-bands or indicates one of the base codewords in a corresponding sub-band among the plurality of sub-bands.

7. The communication method of claim 3, wherein:
when the correlation codeword indicator is fixed as a predetermined matrix, the base codeword indicator indicates one of the base codewords in a wideband comprising a plurality of sub-bands or in a corresponding sub-band from among the plurality of sub-bands, and the differential codeword indicator indicates one of the differential codewords in the corresponding sub-band among the plurality of sub-bands,
the generating comprises refining the base codeword indicator using the differential codeword indicator to generate the precoding matrix for the receiver.

8. The communication method of claim 7, wherein the receiving comprises sequentially receiving one or more differential codeword indicators with respect to a single base codeword indicator.

9. The communication method of claim 2, wherein the generating comprises:
refining the base codeword indicator using the differential codeword indicator; and
performing an inner product between the base codeword indicator and the refined base codeword indicator to generate the precoding matrix for the receiver.

10. The communication method of claim 2, wherein:
when the differential codeword indicator is fixed as a predetermined matrix and the base codeword indicator indicates one of the base codewords in a wideband comprising a plurality of sub-bands or in a corresponding sub-band among the plurality of sub-bands,
the generating comprises adaptively adjusting the precoding matrix for the receiver using the correlation codeword indicator.

11. The communication method of claim 2, wherein:
the base codeword indicator indicates one of the base codewords in a wideband comprising a plurality of sub-bands or in a corresponding sub-band from among the plurality of sub-bands, and the differential codeword indicator indicates one of the differential codewords in the corresponding sub-band from among the plurality of sub-bands,
the receiving comprises receiving the base codeword indicator and the differential codeword indicator in the same time interval, and
the generating comprises refining the base codeword indicator in a frequency domain using the differential codeword indicator to generate the precoding matrix for the receiver.

12. The communication method of claim 2, wherein:
the base codeword indicator indicates one of the base codewords in a wideband that comprises a plurality of sub-bands, and the differential codeword indicator indicates one of the differential codewords in the corresponding sub-band from among the plurality of sub-bands,
the receiving comprises receiving each of the base codeword indicator and the differential codeword indicator in a different time interval, and
the generating comprises refining the base codeword indicator in both a time domain and a frequency domain using the differential codeword indicator to generate the precoding matrix for the receiver.

13. The communication method of claim 2, wherein:
the base codeword indicator indicates one of the base codewords in a corresponding sub-band from among a plurality of sub-bands, and the differential codeword indicator indicates one of the differential codewords in the corresponding sub-band from among the plurality of sub-bands,
the receiving comprises receiving the base codeword indicator and the differential codeword indicator in the same time interval, and
the generating comprises refining the base codeword indicator in a frequency domain using the differential codeword indicator to generate the precoding matrix for the receiver.

14. The communication method of claim 2, wherein:
the base codeword indicator indicates one of the base codewords in a corresponding sub-band from among a plurality of sub-bands, and the differential codeword indicator indicates one of the differential codewords in the corresponding sub-band from among the plurality of sub-bands, the receiving comprises receiving each of the base codeword indicator and the differential codeword indicator at different time intervals, and the generating comprises refining the base codeword indicator in a time domain using the differential codeword indicator to generate the precoding matrix for the receiver.

15. A communication method of a receiver in a MIMO communication system, the communication method comprising:

estimating a channel formed between a transmitter and the receiver;

accessing a base codebook comprising base codewords and an additional codebook comprising additional codewords;

generating, based on the estimated channel, a base codeword indicator that indicates one of the base codewords included in the base codebook recommended for a wideband and an additional codeword indicator that indicates one of the additional codewords included in the additional codeword recommended for a sub-band from among a plurality of sub-bands included in the wideband; and transmitting the base codeword indicator recommended for the wideband and the additional codeword indicator recommended for the sub-band to the transmitter.

16. The communication method of claim 15, wherein the additional codebook comprises a differential codebook that comprises differential codewords.

17. The communication method of claim 16, wherein the additional codebook further comprises a correlation codebook that comprises correlation codewords.

18. The communication method of claim 17, wherein the generating comprises generating the base codeword indicator that indicates one of the base codewords included in the base codebook, a differential codeword indicator that indicates one of the differential codewords included in the differential codebook, and a correlation codeword indicator that indicates one of the correlation codewords included in the correlation codebook.

19. The communication method of claim 17, wherein at least one of the differential codeword indicator and the correlation codeword indicator is fixed as a predetermined matrix.

20. The communication method of claim 16, wherein the base codeword indicator indicates one of the base codewords in a wideband that comprises a plurality of sub-bands or in a corresponding sub-band from among the plurality of sub-bands, and the differential codeword indicator indicates one of the differential codewords in the corresponding sub-band from among the plurality of sub-bands.

21. A transmitter supporting multiple feedback modes in a multiple-input multiple-output (MIMO) network, the transmitter comprising:

a memory configured to store at least a first mode codebook and a second mode codebook;

a receiving unit configured to receive, from a receiver, a first codeword indicator that indicates a first codeword from among a plurality of codewords included in the first mode codebook recommended for a wideband, and a second codeword indicator that indicates a second codeword out of a plurality of codewords included in the second mode codebook recommended for a sub-band from among a plurality of sub-bands included in the wideband;

a precoding matrix generator configured to generate a precoding matrix for the receiver in the sub-band based on the first codeword indicator recommended for the wideband and the second codeword indicator recommended for the sub-band;

a precoder configured to precode at least one data stream using the generated precoding matrix; and a transmitting unit configured to transmit the precoded at least one data stream to the receiver.

22. The transmitter of claim 21, wherein the received first codeword indicator indicates a base codeword from a base codebook recommended in the wideband that comprises the plurality of sub-bands, and the received second codeword indicator indicates a differential codeword from a differential codebook recommended in the sub-band out of the plurality of sub-bands in the wideband, and the precoding matrix generator generates the precoding matrix by refining the received base codeword using the received differential codeword.

23. A receiver supporting multiple feedback modes in a multiple-input multiple-output (MIMO) network, the receiver comprising:

a channel estimator configured to estimate a channel formed between the receiver and a transmitter;

a memory configured to store at least a first mode codebook and a second mode codebook; and an indicator generator configured to generate a first codeword indicator that indicates a first codeword out of a plurality of codewords included in the first mode codebook recommended for a wideband, and configured to generate a second codeword indicator that indicates a second codeword out of a plurality of codewords included in the second mode codebook recommended for a sub-band from among a plurality of sub-bands included in the wideband; and a transmitting unit configured to transmit the first codeword indicator recommended for the wideband and the second codeword indicator recommended for the sub-band to the transmitter.

24. The receiver of claim 23, wherein the first codeword indicator indicates a base codeword from a base codebook recommended in the wideband that comprises the plurality of sub-bands, and the second codeword indicator indicates a differential codeword from a differential codebook recommended in the sub-band out of the plurality of sub-bands in the wideband.

25. The receiver of claim 23, wherein the transmitting unit transmits the first codeword indicator at a first time interval and transmits the second codeword indicator at a second time interval that is different from the first time interval.

26. The receiver of claim 23, wherein the transmitting unit transmits the first codeword indicator and the second codeword indicator at the same time interval.

* * * * *